United States Patent
Hayashi

(10) Patent No.: US 7,126,764 B2
(45) Date of Patent: Oct. 24, 2006

(54) OBJECTIVE LENS AND OPTICAL HEAD DEVICE PROVIDED WITH THE SAME

(75) Inventor: Kenichi Hayashi, Nagano (JP)

(73) Assignee: NIDEC Sankyo Corporation, Nagano (JP)

(*) Notice: Subject to any disclaimer, the term of this patent is extended or adjusted under 35 U.S.C. 154(b) by 0 days.

(21) Appl. No.: 11/173,724

(22) Filed: Jul. 1, 2005

(65) Prior Publication Data

US 2006/0001934 A1   Jan. 5, 2006

(30) Foreign Application Priority Data

Jul. 5, 2004 (JP) ............................. 2004-198538

(51) Int. Cl.
*G02B 13/18* (2006.01)
(52) U.S. Cl. ...................... 359/719; 359/718
(58) Field of Classification Search ............ 359/719
See application file for complete search history.

(56) References Cited

U.S. PATENT DOCUMENTS 6,822,800 B1 * 11/2004 Koreeda et al. ........... 359/634

2004/0130804 A1 * 7/2004 Mimori ..................... 359/719

FOREIGN PATENT DOCUMENTS

JP   10-055564   2/1998

* cited by examiner

*Primary Examiner*—Jordan M. Schwartz
(74) *Attorney, Agent, or Firm*—Reed Smith LLP

(57) ABSTRACT

According to the present invention, there is provided an objective lens for an optical head device which condenses two or more laser beams having wavelengths corresponding to two or more optical recording mediums having different thicknesses of transparent substrates on recording surfaces of the optical recording mediums via one optical condensing system to record information on the recording surfaces and/or reproduce the information on the recording surfaces, the objective lens comprising: a refractive surface including: a middle region which is formed in a middle portion of the refractive surface centering on an optical axis of the objective lens and which is used with respect to all of the optical recording mediums; one or more peripheral regions which are concentrically formed outside the middle region; and an aperture limiting ring band which is concentrically formed between the middle region and the peripheral region or between the peripheral regions.

11 Claims, 4 Drawing Sheets

SPHERICAL
ABERRATION

SPHERICAL
ABERRATION

OBJECTIVE LENS AND OPTICAL HEAD DEVICE PROVIDED WITH THE SAME

CROSS-REFERENCE TO RELATED APPLICATION

This application claims priority of Japanese Patent Application No. 2004-198538, filed Jul. 5, 2004, the complete disclosure of which is hereby incorporated by reference.

BACKGROUND OF THE INVENTION

1. Field of the Invention

The present invention relates to an objective lens for use in an optical head device for recording and reproducing data with respect to optical recording mediums such as a CD and a DVD having different thicknesses of transparent substrates, using laser light having different wavelengths. The present invention also relates to an optical head device provided with the objective lens.

2. Description of the Related Art

An optical head device has heretofore been known which records and reproduces data with respect to optical recording mediums having different thicknesses of transparent substrates for protecting recording surfaces, and different recording densities, using laser light having different wavelengths. Examples of the optical recording medium include a CD, a DVD and the like. Here, in the CD, the thickness of the transparent substrate which protects the recording surface is 1.2 mm. In the DVD, the thickness of the transparent substrate is 0.6 mm, and is smaller than that of the CD, and a recording density is higher than that of the CD. Therefore, for example, the laser light having a wavelength of 790 nm is used in the recording/reproducing with respect to the CD, whereas laser light having a wavelength of 660 nm is used in the recording/reproducing with respect to the DVD. In the objective lens of the optical head device, a numerical aperture NA1 required in the recording/reproducing with respect to the CD is, for example, 0.45, and an numerical aperture NA2 required in the recording/reproducing of the DVD is, for example, 0.6.

In this type of optical head device, in order to achieve miniaturization and thickness reduction of the device, an arrangement has been proposed in which laser light having a wavelength corresponding to each optical recording medium is condensed on the recording surface of the optical recording medium using a single optical condensing system (see, e.g., Japanese Patent Application Laid-Open No. 10-55564). In the optical head device described in Japanese Patent Application Laid-Open No. 10-55564, an objective lens is used which has a refractive surface comprising a middle region centering on an optical axis and a peripheral region concentrically formed on an outer peripheral side of the middle region.

As described above, for example, since the numerical aperture NA1 required in the recording/reproducing with respect to the CD is 0.45, and a numerical aperture NA2 required in the recording/reproducing with respect to the DVD is 0.6, the laser light in the region outside the numerical aperture NA1 is a noise component which does not contribute the recording/reproducing in the recording/reproducing with respect to the CD in a case where the single optical condensing system is used. Therefore, since the vicinity of the numerical aperture NA1 required in the recording/reproducing with respect to the CD is a boundary between the middle region and the peripheral region in the refractive surface of the objective lens, this boundary portion is provided with a discontinuous surface whose spherical aberration is discontinuous is formed. In this arrangement, at a recording/reproducing time of the CD, the laser light of the region outside NA1 is prevented from being condensed on the recording surface of the CD, and noises are prevented from being generated.

OBJECTS AND SUMMARY OF THE INVENTION

However, at the recording/reproducing time of the DVD, the laser light in the vicinity of the numerical aperture NA1 is also laser light effective for the recording/reproducing. In the objective lens described in Japanese Patent Application Laid-Open No. 10-55564, because of an influence of the discontinuous surface formed in the boundary portion between the middle region and the peripheral region, a discontinuous portion of the spherical aberration is produced in which the spherical aberration largely fluctuates from a negative direction to a positive direction, in the vicinity of the numerical aperture NA1 in which the laser light is effectively used at the recording/reproducing time of the DVD. The discontinuous portion of the spherical aberration generated in the vicinity of the numerical aperture NA1 is a cause for distortion or shrinkage of a spot shape formed on the recording surface of the DVD. Especially at the recording time when a satisfactory quality of the spot shape is required, the spherical aberration generated in the vicinity of the numerical aperture NA1 has a large influence on the spot shape, and the spherical aberration is required to be suppressed in this portion.

In Japanese Patent Application Laid-Open No. 10-55564, there is described an idea concerning the objective lens for preventing the generation of the discontinuous portion of the spherical aberration in which the spherical aberration largely fluctuates from the negative direction to the positive direction. However, in Japanese Patent Application Laid-Open No. 10-55564, there is not described an objective lens provided with a specific arrangement for realizing this idea.

Therefore, an object of the present invention is to provide a specific arrangement of an objective lens which prevents generation of a discontinuous portion of a spherical aberration where the spherical aberration largely fluctuates from a negative direction to a positive direction in an effective portion of laser light at a recording/reproducing time of an optical recording medium. Another object of the present invention is to provide an optical head device provided with the objective lens.

To solve the above-described problems, according to the present invention, there is provided an objective lens for an optical head device which condenses two or more laser beams having wavelengths corresponding to two or more optical recording mediums having different thicknesses of transparent substrates on recording surfaces of the optical recording mediums via one optical condensing system to record information on the recording surfaces and/or reproduce the information on the recording surfaces, the objective lens comprising: a refractive surface including: a middle region which is formed in a middle portion of the refractive surface centering on an optical axis of the objective lens and which is used with respect to all of the optical recording mediums; one or more peripheral regions which are concentrically formed outside the middle region; and an aperture limiting ring band which is concentrically formed between the middle region and the peripheral region or between the peripheral regions, wherein the middle region includes: a plurality of middle ring-band refractive surfaces having aspherical shapes which are mutually different in refractive power; and stepped portions formed toward an optical axis direction in boundaries of the plurality of middle ring-band refractive surfaces, radial direction positions of the stepped portions are used as positions to correct spherical aberrations with respect to all of the optical recording mediums, and heights of the stepped portions and the aspherical shapes of the middle ring-band refractive surfaces excluding the middle ring-band refractive surfaces disposed adjacent to the aperture limiting ring band are formed in such a manner as to correct the spherical aberrations with respect to all of the optical recording mediums, the aperture limiting ring band is formed in the vicinity of a numerical aperture required in recording/reproducing the information with respect to one of the optical recording mediums in order to prevent the laser beam corresponding to the optical recording medium from being condensed on the recording surface of the optical recording medium, the peripheral region comprises one or more peripheral ring-band refractive surfaces, and the middle ring-band refractive surface and the peripheral ring-band refractive surface disposed adjacent to the aperture limiting ring band, or the peripheral ring-band refractive surfaces disposed adjacent to an inner peripheral side and an outer peripheral side of the aperture limiting ring band are formed into the aspherical shapes optimized with respect to the specific optical recording medium.

In the present invention, the middle region includes the plurality of middle ring-band refractive surfaces having the aspherical shapes which are mutually different in the refractive power, and the stepped portions are formed toward the optical axis direction in the boundaries of the plurality of middle ring-band refractive surfaces. The radial direction positions of the stepped portions are used as the positions to correct the spherical aberrations with respect to all of the optical recording mediums for use in the optical head device. Moreover, the heights of the stepped portions and the aspherical shapes of the middle ring-band refractive surfaces excluding the middle ring-band refractive surfaces disposed adjacent to the aperture limiting ring band are formed in such a manner as to correct the spherical aberrations with respect to all of the optical recording mediums. Therefore, in the middle region, the spherical aberrations can be corrected with good balances with respect to all of the optical recording mediums.

Moreover, the aperture limiting ring band is formed in the vicinity of the numerical aperture required in the recording/reproducing with respect to one of the optical recording mediums in order to prevent the laser beam corresponding to the optical recording medium from being condensed on the recording surface of the optical recording medium. Therefore, it is possible to prevent generation of noises by the laser beams of an outside region of the numerical aperture required at a recording/reproducing time of the optical recording medium.

Furthermore, the peripheral region comprises one or more peripheral ring-band refractive surfaces, and the middle ring-band refractive surface and the peripheral ring-band refractive surface disposed adjacent to the aperture limiting ring band, or the peripheral ring-band refractive surfaces disposed adjacent to the inner peripheral side and the outer peripheral side of the aperture limiting ring band are formed into the aspherical shapes optimized with respect to the specific optical recording medium. Therefore, by a simple construction, it is possible to prevent the generating of the discontinuous portion of the spherical aberration where the spherical aberration largely fluctuates from the negative direction to the positive direction in the effective portion of the laser beam at the recording/reproducing time of the specific optical recording medium.

In the present invention, for example, the optical recording mediums include a first optical recording medium on which a first laser beam having a first wavelength is condensed, and a second optical recording medium on which a second laser beam having a second wavelength shorter than the first wavelength is condensed. The middle region is used with respect to the first and second optical recording mediums, and the peripheral region is used only with respect to the second optical recording medium. The aperture limiting ring band is formed in the vicinity of the numerical aperture required in the recording/reproducing with respect to the first optical recording medium in order to prevent the first laser beam from being condensed on the recording surface of the first optical recording medium and to condense the second laser beam on the recording surface of the second optical recording medium. The middle ring-band refractive surface and the peripheral ring-band refractive surface disposed adjacent to the aperture limiting ring band are formed into the aspherical shapes optimized with respect to the second optical recording medium.

In this case, the discontinuous portion of the spherical aberration where the spherical aberration largely fluctuates from the negative direction to the positive direction is not generated in the effective portion of the laser beam at the recording/reproducing time of the second optical recording medium, and it is possible to secure quality of a spot shape formed on the recording surface of the second optical recording medium. At the recording/reproducing time of the first optical recording medium, it is possible to prevent generation of noises by the laser beams of the outside region of the numerical aperture required in the recording/reproducing with respect to the first optical recording medium.

In the present invention, an inner periphery of the aperture limiting ring band preferably substantially agrees with the numerical aperture required in the recording/reproducing with respect to the first optical recording medium. In this case, it is possible to sufficiently secure the numerical aperture of the first optical recording medium while preventing the generation of the noise, and a recording/reproducing performance of the first optical recording medium can be enhanced.

In the present invention, the aperture limiting ring band includes a phase shifter which is added and formed into the aspherical shape optimized with respect to the second optical recording medium and which generates a phase difference in the first laser beam. Alternatively, the aperture limiting ring band includes diffraction grating which is added and formed into the aspherical shape optimized with respect to the second optical recording medium and in which a grating stepped portion is formed toward the optical axis direction. By this simple construction, the aperture of the first laser beam is satisfactorily limited, and the first laser beam can be simply passed in the aperture limiting ring band.

In the present invention, assuming that the first wavelength is $\lambda 1$, the second wavelength is $\lambda 2$, refractive indexes of the first and second laser beams in the objective lens are $n1$, $n2$, and arbitrary integers are a, b, a height d of the grating stepped portion preferably satisfies a relation of:

$$d = a \times \lambda 2/(n2-1) \text{ and } d = (b+0.5) \times \lambda 1 \times (n1-1).$$

In this construction, the aperture is appropriately limited with respect to the first laser beam without influencing intensity of the second laser beam passed through the objective lens.

In the present invention, for example, the height d of the grating stepped portion may correspond to approximately three times $\lambda 2/(n2-1)$, and approximately 2.5 times $\lambda 1/(n1-1)$ in a case where the first optical recording medium is a CD, and the second optical recording medium is a DVD. By this construction, the grating stepped portion of the diffraction grating can be lowest, and an optimum height of the grating stepped portion can be obtained.

In the present invention, a grating groove pitch of the diffraction grating is five times or more a larger value of the first wavelength and the grating stepped portion, and 50 times or less a smaller value of the second wavelength and the grating stepped portion. When the grating groove pitch is smaller than five times the larger value in the values indicated by the first wavelength and the grating stepped portion, primary diffracted light of the first laser beam is degraded, and a sufficient aperture limiting function cannot be fulfilled. When the grating groove pitch is larger than 50 times the smaller value in the values indicated by the second wavelength and the grating stepped portion, the aperture limiting ring band is excessively broadened, and transmission efficiency of the second laser beam drops. That is, when the aperture limiting ring band is excessively broadened, the grating stepped portion needs to be formed even in a region where a tangent angle of the refractive surface is large. In this case, since it is difficult to form the grating stepped portion in parallel with the optical axis in working the lens, the transmission efficiency of the second laser beam drops. When the aperture limiting ring band is excessively broadened, the peripheral region, which is the simple refractive surface and whose transmission efficiency is high, is narrowed. This is also a cause for the drop of the transmission efficiency of the second laser beam. Therefore, the grating groove pitch is preferably set as described above.

Moreover, in the present invention, the optical recording mediums include a first optical recording medium on which a first laser beam having a first wavelength is condensed, a second optical recording medium on which a second laser beam having a second wavelength shorter than the first wavelength is condensed, and a third optical recording medium on which a third laser beam having a third wavelength shorter than the second wavelength is condensed. The middle region is used with respect to the first, second, and third optical recording mediums. The peripheral region includes a first peripheral region which is used with respect to the second and third optical recording mediums, and a second peripheral region which is formed outside the first peripheral region and which is used only with respect to the third optical recording medium. The aperture limiting ring band includes a first aperture limiting ring band formed between the middle region and the first peripheral region, and a second aperture limiting ring band formed between the first and second peripheral regions. The first aperture limiting ring band is formed in the vicinity of the numerical aperture required in the recording/reproducing with respect to the first optical recording medium in order to prevent the first laser beam from being condensed on the recording surface of the first optical recording medium, to condense the second laser beam on the recording surface of the second optical recording medium, and to condense the third laser beam on the recording surface of the third optical recording medium. The second aperture limiting ring band is formed in the vicinity of the numerical aperture required in the recording/reproducing with respect to the second optical recording medium in order to prevent at least the second laser beam from being condensed on the recording surface of the second optical recording medium and to condense the third laser beam on the recording surface of the third optical recording medium. The peripheral ring-band refractive surfaces disposed adjacent to the inner peripheral side and the outer peripheral side of the second aperture limiting ring band may be formed into the aspherical shapes optimized with respect to the third optical recording medium.

In this case, the peripheral ring-band refractive surfaces disposed adjacent to the inner and outer peripheral sides of the second aperture limiting ring band are formed into the aspherical shapes optimized with respect to the third optical recording medium. Therefore, in the effective portion of the third laser beam where the quality of the spot shape is not easily secured and the wavelength is shortest, the discontinuous portion of the spherical aberration where the spherical aberration largely fluctuates from the negative direction to the positive direction is not generated. It is possible to secure quality of the spot shape formed on the recording surface of the third optical recording medium.

Moreover, at the recording/reproducing time of the first optical recording medium, the first aperture limiting ring band can prevent the generation of the noise by the laser beam of the outside region of the numerical aperture required in the recording/reproducing with respect to the first optical recording medium. At the recording/reproducing time of the second optical recording medium, the second aperture limiting ring band can prevent the generation of the noise by the laser beam of the outside region of the numerical aperture required in the recording/reproducing with respect to the second optical recording medium. Therefore, the recording/reproducing performances of the first and second optical recording mediums can be enhanced.

Moreover, according to the present invention, there is provided an objective lens for an optical head device which condenses two or more laser beams having wavelengths corresponding to two or more optical recording mediums having different thicknesses of transparent substrates on recording surfaces of the optical recording mediums via one optical condensing system to record information on the recording surfaces and/or reproduce the information on the recording surfaces, the objective lens comprising: a refractive surface including: a middle region which is formed in a middle portion of the refractive surface centering on an optical axis of the objective lens and which is used with respect to all of the optical recording mediums; one or more peripheral regions which are concentrically formed outside the middle region; and an aperture limiting ring band which is concentrically formed between the middle region and the peripheral region or between the peripheral regions, wherein the middle region includes: a plurality of middle ring-band refractive surfaces having aspherical shapes which are mutually different in refractive power; and stepped portions formed toward an optical axis direction in boundaries of the plurality of middle ring-band refractive surfaces, radial direction positions of the stepped portions are used as positions to correct spherical aberrations with respect to all of the optical recording mediums, and heights of the stepped portions and the aspherical shapes of the middle ring-band refractive surfaces are formed in such a manner as to correct the spherical aberrations with respect to all of the optical recording mediums, the aperture limiting ring band is formed in a numerical aperture required in recording/reproducing the information with respect to one of the optical recording medium in order to prevent the laser beam corresponding to the optical recording medium from being condensed on the recording surface of the optical recording medium, the peripheral region comprises one or more peripheral ring-band refractive surfaces, and the peripheral ring-band refractive surface disposed adjacent to an outer peripheral side of the aperture limiting ring band is formed into the aspherical shape optimized with respect to the specific optical recording medium.

By this construction, in the middle region, the spherical aberrations can be corrected with good balances with respect to all of the optical recording mediums. The aperture limiting ring band can prevent generation of a noise by the laser beam in an outside region of the numerical aperture required at a recording/reproducing time of one optical recording medium. Furthermore, the peripheral ring-band refractive surface disposed adjacent to the outer peripheral side of the aperture limiting ring band is formed into the aspherical shape optimized with respect to the specific optical recording medium. Therefore, it is possible to prevent generation of a discontinuous portion of the spherical aberration where the spherical aberration largely fluctuates from a negative direction to a positive direction in an effective portion of the laser beam at the recording/reproducing time of the specific optical recording medium.

According to the present invention, the objective lens can be used in an optical head device comprising: an optical condensing system having the objective lens; and a laser light source which emits the laser beam, the optical head device recording information on the recording surface and/or reproducing the information on the recording surface.

As described above, in the objective lens according to the present invention, the aperture limiting ring band prevents the generation of the noise by the laser beam in the outside region of the numerical aperture required at the recording/reproducing time of one optical recording medium while correcting the spherical aberration with the good balance with respect to all of the optical recording mediums in the middle region. The aspherical shapes optimized with respect to the specific optical recording medium are formed on the middle and peripheral ring-band refractive surfaces disposed adjacent to the aperture limiting ring band, the peripheral ring-band refractive surfaces disposed adjacent to the inner and outer peripheral sides of the aperture limiting ring band, or the peripheral ring-band refractive surface disposed adjacent to the outer peripheral side of the aperture limiting ring band. Therefore, the discontinuous portion of the spherical aberration where the spherical aberration largely fluctuates from the negative direction to the positive direction is not generated in the effective portion of the laser beam at the recording/reproducing time of the specific optical recording medium. Therefore, it is possible to secure the quality of the recording/reproducing with respect to all of the optical recording mediums for use in the optical head device.

BRIEF DESCRIPTION OF THE DRAWINGS

In the drawings:

FIG. 4 shows a spherical aberration amount in a case where the objective lens shown in FIG. 2 is used.

FIG. 7 shows a spherical aberration amount in a case where the objective lens is used according to the other embodiment of the present invention.

DESCRIPTION OF THE PREFERRED EMBODIMENTS

A best mode for carrying out the present invention will be described hereinafter with reference to the drawings.

[Embodiment 1]

(Schematic Construction of Optical Head Device)

Figure 1:
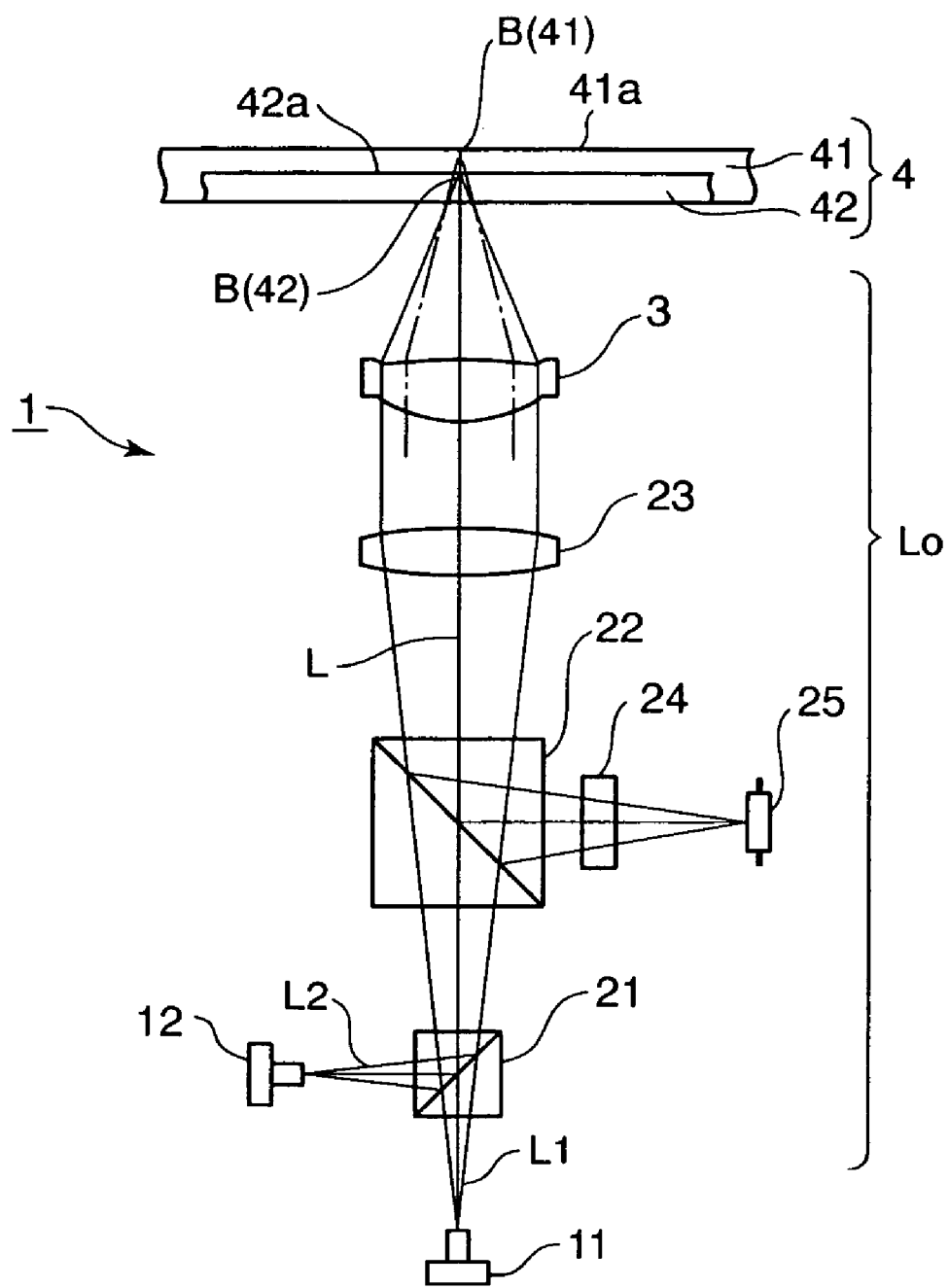
FIG. 1 is a schematic diagram schematically showing an outline arrangement of an optical head device according to Embodiment 1 of the present invention.

FIG. 1 is a schematic diagram schematically showing an outline arrangement of an optical head device according to Embodiment 1 of the present invention.

In FIG. 1, an optical head device 1 condenses a plurality of laser beams having wavelengths corresponding to a plurality of types of optical recording mediums 4 having different thicknesses of transparent substrates or recording densities, such as a CD and a DVD, on recording surfaces of the optical recording mediums 4 via one optical condensing system Lo to reproduce or record information with respect to the optical recording mediums 4. The optical recording mediums 4 in the present embodiment include a CD 41 which is a first optical recording medium, and a DVD 42 which is a second optical recording medium. The optical head device 1 includes: a first laser light source 11 for emitting a first laser beam L1, for example, having a first wavelength of 790 nm for use in reproducing the information from the CD 41; and a second laser light source 12 for emitting a second laser beam L2, for example, having a second wavelength of 660 nm for use in reproducing the information from the DVD 42. The respective laser beams L1, L2 are guided into the optical recording mediums 4 via the common optical condensing system Lo, and return beams of the respective laser beams L1, L2 reflected by the optical recording mediums 4 are guided into a common light receiving element 25.

The optical condensing system Lo includes: a first beam splitter 21 which allows the first laser beam L1 to propagate rectilinearly and which reflects the second laser beam L2 to align both of the beams with a system optical axis L (optical axis of an objective lens, hereinafter referred to as the optical axis L); a second beam splitter 22 which passes the laser beams L1, L2 traveling along the optical axis L; a collimating lens 23 for converting the laser beams L1, L2 passed through the second beam splitter 22 into parallel beams; and an objective lens 3 for forming beam spots of the laser beams L1, L2 emitted from the collimating lens 23 on recording surfaces of the optical recording mediums 4. In the present embodiment, as to a recording surface 42a of the DVD 42 which is the optical recording medium 4, and a recording surface 41a of the CD 41, the beam spot of the first laser beam L1 is formed on the recording surface 41a of the CD 41, and the beam spot of the second laser beam L2 is formed on the recording surface 42*a* of the DVD 42 by the objective lens 3.

Moreover, the optical condensing system Lo includes a grating 24 for guiding into the common light receiving element 25 the return beams of the first and second laser beams L1, L2 reflected by the optical recording mediums 4 and then the second beam splitter 22.

To record/reproduce the information with respect to the CD 41 which is the optical recording medium 4 in the optical head device 1 constituted in this manner, the first laser light source 11 emits the first laser beam L1 having a wavelength of 790 nm. The first laser beam L1 is guided into the optical condensing system Lo to form a beam spot B(41) on the recording surface 41*a* of the CD 41 via the objective lens 3. The return beam of the first laser beam L1 reflected by the recording surface 41*a* of the CD 41 is condensed onto the common light receiving element 25 via the second beam splitter 22. The information of the CD 41 is reproduced by a signal detected by the common light receiving element 25.

On the other hand, to reproduce the information of the DVD 42 which is the optical recording medium 4, the second laser light source 12 emits the second laser beam L2 having a wavelength of 660 nm. The second laser beam L2 is also guided into the optical condensing system Lo to form a beam spot B(42) on the recording surface 42*a* of the DVD 42 via the objective lens 3. The return beam of the second laser beam L2 reflected by the recording surface 42*a* of the DVD 42 is condensed onto the common light receiving element 25 via the second beam splitter 22. The information of the DVD 42 is reproduced by a signal detected by the common light receiving element 25.

(Construction of Objective Lens)

Figure 2:
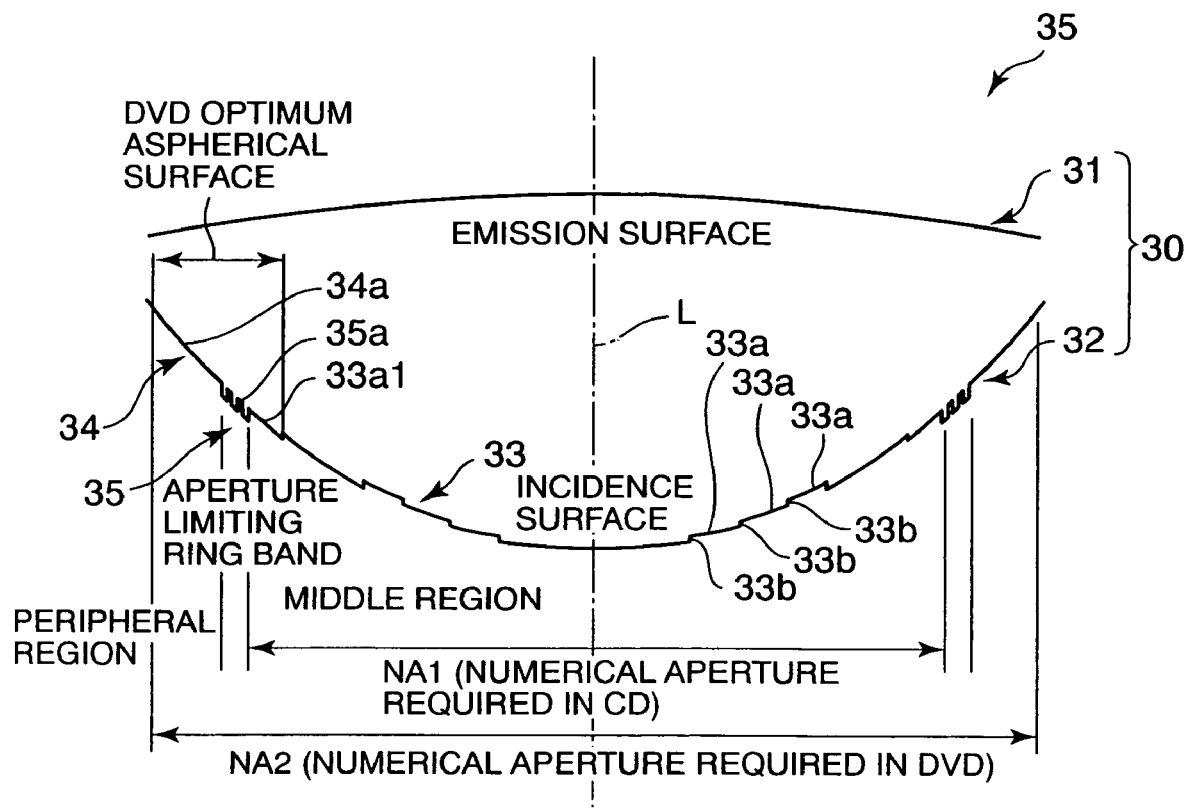
FIG. 2 is a sectional view schematically showing an objective lens of the optical head device shown in FIG. 1.
Figure 3A:
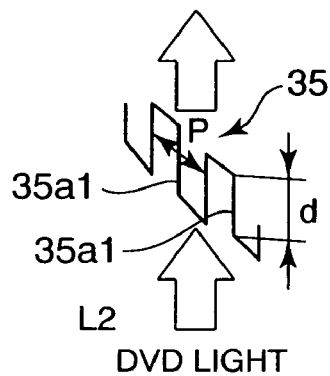
FIG. 3 shows a state in which laser beams pass through an aperture limiting ring band formed on the refractive surface of the objective lens shown in FIG. 2, and FIGS. 3A and 3B are explanatory views showing passed states of a second laser beam and a first laser beam, respectively.
Figure 3B:
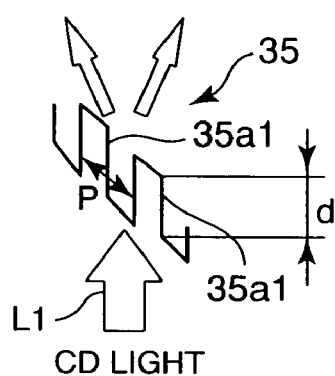
Figure 4A:
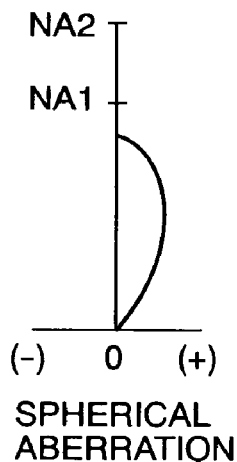
FIGS. 4A and 4B are graphs showing spherical aberrations with respect to the second laser beam and the first laser beam, respectively.
Figure 4B:
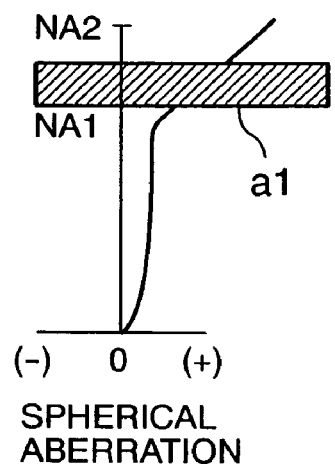

FIG. 2 is a sectional view schematically showing an objective lens of the optical head device shown in FIG. 1. FIG. 3 shows a state in which the laser beam passes through an aperture limiting ring band formed on the refractive surface of the objective lens shown in FIG. 1, and FIGS. 3A and 3B are explanatory views showing passed states of the second laser beam and the first laser beam, respectively. FIG. 4 shows a spherical aberration amount in a case where the objective lens shown in FIG. 2 is used, and FIGS. 4A and 4B are graphs showing spherical aberrations with respect to the second laser beam and the first laser beam.

As shown in FIG. 2, the objective lens 3 is a convex lens whose opposite surfaces are formed into convex shapes. On the objective lens 3, a refraction surface 30 is formed, and the surface includes: an emission surface 31 formed into a single aspherical shape on an optical recording medium 4 side; and an incidence surface 32 formed on the side of the laser light sources 11, 12. The incidence surface 32 includes: a middle region 33 formed in a middle portion of the incidence surface 32 centering on the optical axis L; a peripheral region 34 concentrically formed outside the middle region 33 in a direction crossing the optical axis L at right angles; and an aperture limiting ring band 35. The middle region 33, the aperture limiting ring band 35, and the peripheral region 34 are disposed adjacent to each other in order from a center toward the outside. The middle region 33 is used with respect to the CD 41 and the DVD 42, and the peripheral region 34 is used only with respect to the DVD 42.

The middle region 33 is constituted of a plurality of middle ring-band refractive surfaces 33*a*, 33*a*, . . . (hereinafter referred to as the middle ring-band refractive surfaces 33*a*) which are mutually different in refractive power and which have aspherical shapes. Moreover, stepped portions 33*b*, 33*b*, . . . (hereinafter referred to as the stepped portions 33*b*) are formed toward an optical axis L direction in boundaries among the plurality of middle ring-band refractive surfaces 33*a*. A radial direction position (position in a direction crossing the optical axis L at right angles) of the stepped portion 33*b* is assumed as a position to correct spherical aberrations with respect to both of the CD 41 and the DVD 42 with a good balance. As to the aspherical shape of the middle ring-band refractive surface 33*a* excluding a middle ring-band refractive surface 33*a*1 constituting an outermost peripheral portion of the middle region 33, and a height of the stepped portion 33*b*, they are formed in such a manner as to correct the spherical aberrations with respect to both of the CD 41 and the DVD 42 with the good balance. Furthermore, the middle ring-band refractive surface 33*a*1 constituting the outermost peripheral portion is formed into the aspherical shape in such a manner as to correct the spherical aberration with respect to the DVD 42 in an optimum manner. It is to be noted that, in FIG. 2, only some of the middle ring-band refractive surfaces and the stepped portions are denoted with reference numerals for the sake of convenience.

The peripheral region 34 is provided with a peripheral ring-band refractive surface 34*a*. In the present embodiment, one peripheral ring-band refractive surface 34*a* is formed in the peripheral region 34. This peripheral ring-band refractive surface 34*a* is formed into an aspherical shape in such a manner as to correct the spherical aberration with respect to the DVD 42 to be optimum. It is to be noted that in the present embodiment, as shown in FIG. 2, a numerical aperture of an outer periphery of the peripheral region 34 substantially agrees with a numerical aperture N2 required in recording/reproducing the information with respect to the DVD 42.

The aperture limiting ring band 35 is formed in the vicinity of the numerical aperture NA1 required in the recording/reproducing with respect to the CD 41 in such a manner as to prevent the first laser beam L1 from being condensed on the recording surface 41*a* of the CD 41 and to condense the second laser beam L2 on the recording surface 42*a* of the DVD 42. In the present embodiment, the aperture limiting ring band 35 is formed in such a manner that the inner periphery of the aperture limiting ring band 35 substantially agrees with the numerical aperture NA1 required in the recording/reproducing with respect to the CD 41. When the numerical aperture NA1 required in the recording/reproducing with respect to the CD 41 is 0.47, the aperture limiting ring band 35 is formed, for example, in a range of 0.47 to 0.5 or 0.47 to 0.55 considering from the numerical aperture.

More specifically, in the aperture limiting ring band 35, a diffraction grating 35*a*, in which a grating stepped portion 35*a*1 is formed toward an optical axis L direction, is added and formed into the aspherical shape in such a manner as to correct the spherical aberration with respect to the DVD 42 to be optimum. In this diffraction grating 35*a*, assuming that the first wavelength for use in the CD 41 is λ1, the second wavelength for use in the DVD 42 is λ2, refractive indexes of the first laser beam L1 and the second laser beam L2 in the objective lens 3 are n1, n2, and arbitrary integers are a, b, a height d of the grating stepped portion 35*a*1 satisfies a relation of:

$$d = a \times \lambda 2 / (n2-1) \text{ and } d = (b+0.5) \times \lambda 1 \times (n1-1).$$

Especially in the present embodiment, the height d of the grating stepped portion 35a1 corresponds to approximately three times λ2/(n2−1), and approximately 2.5 times λ1/(n1−1). That is, the height d of the grating stepped portion 35a1 is 3.8 μm. It is to be noted that in the present embodiment, the middle ring-band refractive surface 33a1 constituting the outermost peripheral portion of the middle region 33, the peripheral ring-band refractive surface 34a, and the aperture limiting ring band 35 are formed into the same aspherical shapes.

Moreover, in the present embodiment, a grating groove pitch p of the diffraction grating 35a is five times or more the height of the grating stepped portion 35a1, and 50 times or less the second wavelength (660 nm).

In the aperture limiting ring band 35 constituted in this manner, as schematically shown in FIGS. 3A and 3B, the second laser beam L2 passed through the aperture limiting ring band 35 is condensed on the recording surface 42a of the DVD 42, and the first laser beam L1 passed through the aperture limiting ring band 35 is not condensed on the recording surface 41a of the CD 41.

A spherical aberration amount will be described in a case where the objective lens 3 constituted as described above with reference to FIG. 4. It is to be noted that, in FIG. 4, the ordinate shows a distance from the optical axis L, and the abscissa shows the spherical aberration amount.

As shown in FIG. 4A, as to the spherical aberration with respect to the second laser beam L2, the aspherical shapes of the middle ring-band refractive surfaces 33a excluding the middle ring-band refractive surface 33a1 are formed in such a manner as to correct the spherical aberrations with respect to both of the CD 41 and the DVD 42 with a good balance in an area from the optical axis L to an inner peripheral side of the middle ring-band refractive surface 33a1 constituting the outermost peripheral portion of the middle region 33. Therefore, the aberration fluctuates radially on a plus side, but the amount of the aberration is reduced. The middle ring-band refractive surface 33a1 of the middle region 33 disposed adjacent to the aperture limiting ring band 35, and the peripheral ring-band refractive surface 34a are formed into aspherical shapes in such a manner as to correct the spherical aberration with respect to the DVD 42 to be optimum. In the aperture limiting ring band 35, the diffraction grating 35 provided with the grating stepped portion 35a1 formed toward the optical axis L direction is added and formed with respect to the aspherical shape in such a manner as to correct the spherical aberration with respect to the DVD 42 to be optimum, so that the second laser beam L2 is condensed on the recording surface 42a of the DVD 42. Therefore, in this region, the spherical aberration with respect to the second laser beam L2 is substantially 0.

On the other hand, as shown in FIG. 4B, the spherical aberration with respect to the first laser beam L1 fluctuates on the plus side but the amount is suppressed in an area from the optical axis L to the middle region 33, that is, in an area from the optical axis L to a numerical aperture NA1. The aperture limiting ring band 35 is formed in such a manner as to prevent the first laser beam L1 from being condensed on the recording surface 41a of the CD 41. Therefore, a shielded region a1 where the first laser beam L1 is scattered and interrupted appears in the area of the aperture limiting ring band 35. Since the spherical aberration largely fluctuates on the plus side in the area outside the aperture limiting ring band 35, any noise is not produced.

(Main Effect of Present Embodiment)

As described above, in the objective lens 3 of the present embodiment, a radial direction position of the stepped portion 33b is assumed as a position to correct the spherical aberrations with respect to both of the CD 41 and the DVD 42 with the good balance. The aspherical shapes of the middle ring-band refractive surfaces 33a excluding the middle ring-band refractive surface 33a1 of the outermost peripheral portion of the middle region 33, and the height of the stepped portion 33b are formed in such a manner as to correct the spherical aberrations with respect to both of the CD 41 and the DVD 42 with the good balance. Therefore, the spherical aberrations can be corrected with respect to both of the CD 41 and the DVD 42 with the good balance in the middle region 33. As shown in FIG. 4, the spherical aberrations with respect to both of the CD 41 and the DVD 42 can be reduced in the middle region 33.

Moreover, the aperture limiting ring band 35 is formed in the vicinity of the numerical aperture NA1 required in the recording/reproducing with respect to the CD 41 in such a manner as to prevent the first laser beam L1 from being condensed on the recording surface 41a of the CD 41. That is, as shown in FIG. 4B, the first laser beam L1 is scattered and interrupted in the area of the aperture limiting ring band 35. Therefore, it is possible to prevent the generation of the noise by the influence of the return beam of the first laser beam L1 generated outside the numerical aperture NA1 required at the recording/reproducing time of the CD 41.

Furthermore, the middle ring-band refractive surface 33a1 of the middle region 33 disposed adjacent to the aperture limiting ring band 35, and the peripheral ring-band refractive surface 34a are formed into the aspherical shapes in such a manner as to correct the spherical aberration with respect to the DVD 42 to be optimum. Moreover, the aperture limiting ring band 35 is formed in the vicinity of the numerical aperture NA1 required in the recording/reproducing with respect to the CD 41 in such a manner as to condense the second laser beam L2 on the recording surface 42a of the DVD 42. Therefore, as shown in FIG. 4A, the discontinuous portion of the spherical aberration where the spherical aberration largely fluctuates from the negative direction to the positive direction is not generated in the effective portion of the second laser beam at the recording/reproducing time of the DVD 42. Therefore, it is possible to secure the quality of the beam spot shape formed on the recording surface 42a of the DVD 42. As a result, especially a recording function of the DVD 42 can be enhanced in which the quality of the beam spot shape is required as compared with the CD 41.

In the present embodiment, the aperture limiting ring band 35 is formed so that the inner periphery of the aperture limiting ring band 35 substantially agrees with the numerical aperture NA1 required in the recording/reproducing with respect to the CD 41. Therefore, it is possible to sufficiently secure the numerical aperture NA1 of the CD 41 while preventing the generation of the noise, and a recording/reproducing performance of the CD 41 can be enhanced.

In the present embodiment, in the aperture limiting ring band 35, the diffraction grating 35 provided with the grating stepped portion 35a1 formed toward the optical axis L direction is added and formed into the aspherical shape in such a manner as to correct the spherical aberration with respect to the DVD 42 to be optimum. The height d of the grating stepped portion 35a1 satisfies a predetermined relation among the first wavelength λ1, the second wavelength λ2, and the refractive indexes n1, n2 of the first laser beam L1 and the second laser beam L2 in the objective lens 3.

Especially, the height d of the grating stepped portion 35a1 corresponds to approximately three times λ2/(n2−1), and approximately 2.5 times λ1/(n1−1). Therefore, the grating stepped portion 35a1 of the diffraction grating 35a can be lowest. At the optimum height d of the grating stepped portion 35a1, the aperture can be appropriately limited with respect to the first laser beam L1 without influencing intensity of the second laser beam L2 which passes through the objective lens 3.

In the present embodiment, the grating groove pitch p of the diffraction grating 35 is five times or more the height of the grating stepped portion 35a1, and 50 times or less the second wavelength (660 nm). When the grating groove pitch p is smaller than five times the height of the grating stepped portion 35a1, primary diffracted light of the first laser beam L1 is degraded, and a sufficient aperture limiting function cannot be imparted to the aperture limiting ring band 35. When the grating groove pitch p is larger than 50 times the second wavelength (660 nm), the aperture limiting ring band is excessively broadened, and transmission efficiency of the second laser beam drops. That is, when the aperture limiting ring band is excessively broadened, the grating stepped portion needs to be formed even in a region where a tangent angle of the refractive surface is large. In this case, since it is difficult to form the grating stepped portion in parallel with the optical axis in working the lens, the transmission efficiency of the second laser beam drops. When the aperture limiting ring band is excessively broadened, the peripheral region, which is the simple refractive surface and whose transmission efficiency is high, is narrowed. This is also a cause for the drop of the transmission efficiency of the second laser beam. Therefore, when the grating groove pitch p is formed as in the present embodiment, these problems can be solved.

[Embodiment 2]

Figure 5:
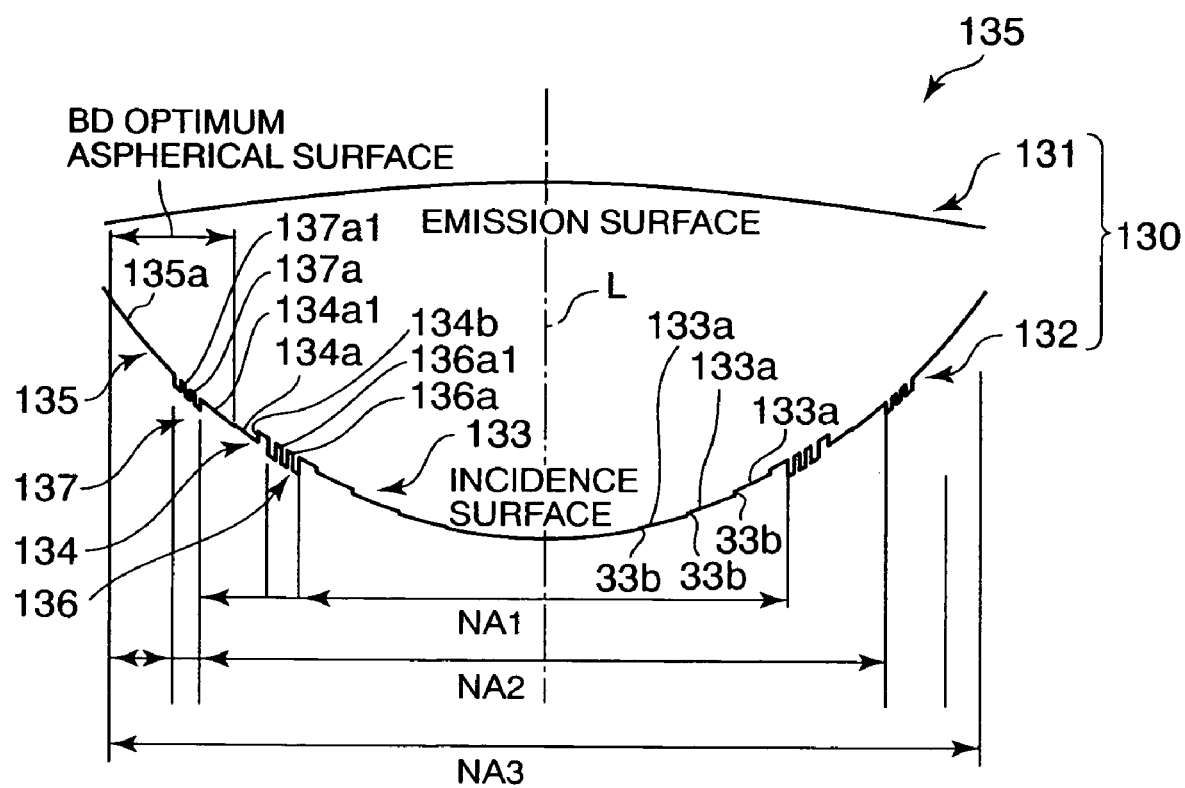
FIG. 5 is a sectional view schematically showing an objective lens according to Embodiment 2 of the present invention.

FIG. 5 is a sectional view schematically showing an objective lens according to Embodiment 2 of the present invention.

The objective lens of Embodiment 1 is applied to an optical head device in which two types of mediums including a CD 41 and a DVD 42 are used as optical recording mediums 4, but the objective lens of the present embodiment is applied to an optical head device in which three types of optical recording mediums having different thicknesses of transparent substrates are used.

In the present embodiment, the optical recording mediums for use in the optical head device include: a CD on which a first laser beam having a first wavelength is condensed; a DVD on which a second laser beam having a second wavelength shorter than the first wavelength is condensed; and a blue ray disc (BD) on which a third laser beam having a third wavelength shorter than the second wavelength is condensed. In the present embodiment, the optical head device is provided with three laser light sources.

As shown in FIG. 5, in the present embodiment, an objective lens 13 is also a convex lens whose opposite surfaces are formed into convex shapes. The objective lens 13 is provided with a refractive surface 130 constituted of an emission surface 131 formed on an optical recording medium 4 side and an incidence surface 132 formed on a laser light source side. The incidence surface 132 comprises: a middle region 133 formed in a middle portion of the incidence surface 132 centering on an optical axis L; a first peripheral region 134 concentrically formed outside the middle region 133; a second peripheral region 135 concentrically formed further outside the first peripheral region 134; a first aperture limiting ring band 136 concentrically formed between the middle region 133 and the first peripheral region 134; and a second aperture limiting ring band 137 concentrically formed between the first peripheral region 134 and the second peripheral region 135. The middle region 133, the first aperture limiting ring band 136, the first peripheral region 134, the second aperture limiting ring band 137, and the second peripheral region 135 are disposed adjacent to each other in this order from a center to the outside. The middle region 133 is used with respect to the CD, the DVD, and the BD, the first peripheral region 134 is used with respect to the DVD and the BD, and the second peripheral region 135 is used only with respect to the BD.

The middle region 133 comprises a plurality of middle ring-band refractive surfaces 133a which are mutually different in refractive power and which have aspherical shapes in the same manner as in Embodiment 1. Moreover, stepped portions 133b are formed toward an optical axis L direction in boundaries among the plurality of middle ring-band refractive surfaces 133a. A radial direction position of the stepped portion 133b is assumed as a position to correct spherical aberrations with respect to all of the CD, the DVD, and the BD with a good balance. As to the aspherical shape of the middle ring-band refractive surface 133a and a height of the stepped portion 133b, they are formed in such a manner as to correct the spherical aberrations with respect to all of the CD, the DVD, and the BD with the good balance.

The first peripheral region 134 comprises a plurality of first peripheral ring-band refractive surfaces 134a which are mutually different in refractive power and which have aspherical shapes. Moreover, stepped portions 134b are formed toward an optical axis L direction in boundaries among the plurality of first peripheral ring-band refractive surfaces 134a. A radial direction position of the stepped portion 134b is assumed as a position to correct the spherical aberrations with respect to both of the DVD and the BD with the good balance. As to the aspherical shapes of the first peripheral ring-band refractive surfaces 134a excluding a first peripheral ring-band refractive surface 134a1 constituting an outermost peripheral portion of the first peripheral region 134, and a height of the stepped portion 134b, they are formed in such a manner as to correct the spherical aberrations with respect to both of the DVD and the BD with the good balance. Furthermore, the first peripheral ring-band refractive surface 134a1 constituting the outermost peripheral portion is formed into the aspherical shape in such a manner as to correct the spherical aberration with respect to the BD to be optimum.

The second peripheral region 135 is provided with a second peripheral ring-band refractive surface 135a, and this second peripheral ring-band refractive surface 135a is formed into the aspherical shape in such a manner as to correct the spherical aberration with respect to the BD to be optimum. It is to be noted that, in the present embodiment, as shown in FIG. 5, an outer periphery of the second peripheral region 135 substantially agrees with a numerical aperture N3 required in recording/reproducing the information with respect to the BD.

The first aperture limiting ring band 136 is formed in the vicinity of the numerical aperture NA1 required in the recording/reproducing with respect to the CD in such a manner as to prevent the first laser beam from being condensed on the recording surface of the CD, to condense the second laser beam on the recording surface of the DVD, and to condense the third laser beam on the recording surface of the BD. In the present embodiment, the first aperture limiting ring band 136 is formed in such a manner that an inner periphery of the first aperture limiting ring band 136 substantially agrees with a numerical aperture NA1 required in the recording/reproducing with respect to the CD.

In the present embodiment, the second aperture limiting ring band 137 is formed in the vicinity of an numerical aperture NA2 required in the recording/reproducing with respect to the DVD in such a manner as to prevent the second laser beam from being condensed on the recording surface of the DVD and to condense the third laser beam on the recording surface of the BD. In the present embodiment, the second aperture limiting ring band 137 is formed in such a manner that the inner periphery of the second aperture limiting ring band 137 substantially agrees with the numerical aperture NA2 required in the recording/reproducing with respect to the DVD.

More specifically, in the first aperture limiting ring band 136, a diffraction grating 136a is formed in which a grating stepped portion 136a1 is formed toward the optical axis L direction. In the second aperture limiting ring band 137, a diffraction grating 137a provided with a grating stepped portion 137a1 formed toward the optical axis L direction is added and formed into the aspherical shape in such a manner as to correct the spherical aberration with respect to the BD to be optimum. For example, the grating stepped portion 136a1 has a height of 3.8 μm, and the grating stepped portion 137a1 ha a height of 3.03 μm.

In the objective lens 13 constructed as described above, as to the first peripheral ring-band refractive surface 134a1 and the second peripheral ring-band refractive surface 135a which are disposed adjacent to the second aperture limiting ring band 137, they are formed into aspherical shapes optimized with respect to the BD. Therefore, a discontinuous portion of the spherical aberration where the spherical aberration largely fluctuates from a negative direction to a positive direction is not generated in an effective portion of the third laser beam having a shortest wavelength, in which quality of a spot shape is not easily secured. It is possible to secure the quality of the spot shape formed on the recording surface of the BD.

Moreover, at a recording/reproducing time of the CD, the first aperture limiting ring band 136 can prevent generation of a noise by the laser beam of an outside region of the numerical aperture NA1 required in the recording/reproducing with respect to the CD. At the recording/reproducing time of the DVD, the second aperture limiting ring band 137 can prevent the generation of the noise by the laser beam of the outside region of the numerical aperture NA2 required in the recording/reproducing with respect to the DVD. Therefore, recording/reproducing performances of the CD and the DVD can be enhanced.

[Other Embodiments]

The above-described embodiment is one example of a preferable mode of the present invention, but the present invention is not limited to the embodiment, and can be variously modified within a range which does not change the scope of the present invention.

Figure 6:
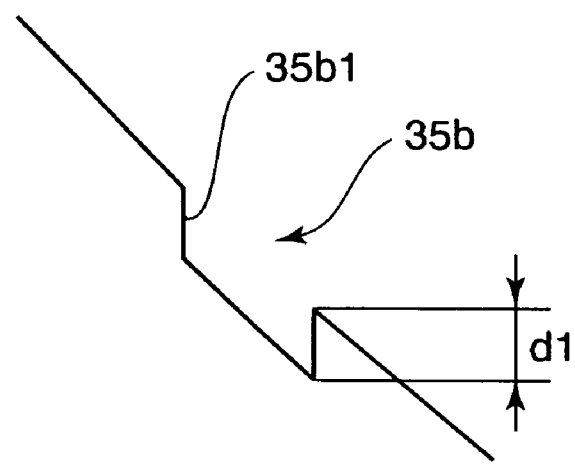
FIG. 6 is an enlarged view showing an arrangement of an aperture limiting ring band in an enlarged size according to another embodiment of the present invention.

For example, in the aperture limiting ring band 35 in Embodiment 1, a phase shifter for generating a phase difference between the first and second laser beams L1 may be added and formed into the aspherical shape in such a manner as to correct the spherical aberration with respect to the DVD 42 to be optimum. That is, a phase shifter 35b provided with a stepped portion 35b1 formed toward the optical axis L direction as shown in FIG. 6 may be formed in a portion where the diffraction grating 35a is formed in FIG. 2. In this case, the phase shifter 35b may substantially generate the phase difference in the first laser beam L1, and may not substantially generate any phase difference in the second laser beam L2. More specifically, a height d1 of the stepped portion 35b1 of the phase shifter 35b may be set in such a manner as to satisfy:

$d1 = c \times \lambda 2/(n2-1)$ (where c is an arbitrary integer).

Moreover, instead of the diffraction gratings, phase shifters may be disposed in the first aperture limiting ring band 136 and the second aperture limiting ring band 137 in Embodiment 2.

Figure 7A:
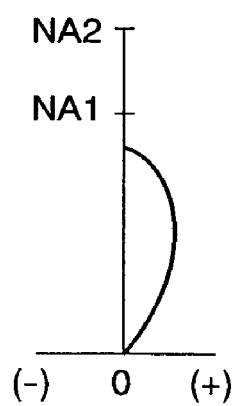
FIGS. 7A and 7B are graphs showing spherical aberrations with respect to the second laser beam and the first laser beam, respectively.
Figure 7B:
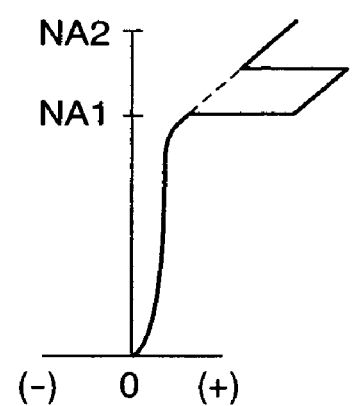

It is to be noted that spherical aberration amounts are as shown in FIGS. 7A and 7B, FIG. 7B in a case where the objective lens is used. As shown in FIG. 7A, the spherical aberration with respect to the second laser beam L2 is equal to that of Embodiment 1 described above. On the other hand, as shown in FIG. 7B, the spherical aberration with respect to the first laser beam L1 largely fluctuates on a plus side and becomes discontinuous in the area of the aperture limiting ring band 35. The spherical aberration largely fluctuates on the plus side even in an area outside the aperture limiting ring band 35. Therefore, it is possible to prevent the generation of the noise by the first laser beam L1 in the area outside the middle region 33.

Moreover, in Embodiment 1, the middle ring-band refractive surface 33a1 constituting the outermost peripheral portion of the middle region 33 is formed into the aspherical shape in such a manner as to correct the spherical aberration with respect to the DVD 42 to be optimum, but the middle ring-band refractive surface 33a1 may be formed in such a manner as to correct the spherical aberrations with respect to both of the CD 41 ad the DVD 42 with the good balance. In this case, the quality of the beam spot shape of the DVD 42 is inferior to that of Embodiment 1, but it is possible to prevent the generation of the noise by the influence of the return beam of the first laser beam L1 generated outside the numerical aperture NA1 required in the recording/reproducing time of the CD 41. The discontinuous portion of the spherical aberration where the spherical aberration largely fluctuates from the negative direction to the positive direction cannot be generated in the effective portion of the second laser beam at the recording/reproducing time of the DVD 42.

Furthermore, in Embodiment 2, the first peripheral ring-band refractive surface 134a1 constituting the outermost peripheral portion of the first peripheral region 134 is formed into the aspherical shape in such a manner as to correct the spherical aberration with respect to the BD to be optimum, but the first peripheral ring-band refractive surface 134a1 may be formed in such a manner as to correct the spherical aberrations with respect to both of the DVD and the BD with the good balance. In this case, the quality of the beam spot shape of the BD is inferior to that of Embodiment 2, but it is possible to prevent the generation of the noise by the second laser beam L2 generated outside the numerical aperture NA2 required in the recording/reproducing time of the DVD. The discontinuous portion of the spherical aberration where the spherical aberration largely fluctuates from the negative direction to the positive direction cannot be generated in the effective portion of the third laser beam at the recording/reproducing time of the BD.

Additionally, the optical recording mediums 4 in Embodiment 1 are not limited to the CD 41 and the DVD 42, and the objective lens 3 may be used even for the BD. That is, it is possible to apply the objective lens of the present invention to an optical head device for use in both of the CD and the BD or an optical head device for use in both of the DVD and the BD.

Moreover, the aperture limiting ring band does not have to be disposed directly in the objective lens 3, and effects similar to the above-described effects can be obtained in an objective lens unit in which the aperture limiting ring band is constituted as a separate element, and the element is assembled in the vicinity of an objective lens that is not provided with any aperture limiting ring band. The construction of the present embodiment is applicable not only to the objective lens but also to a lens for another optical head device, such as a collimator lens.

Furthermore, the objective lens of the present invention is not limited to the optical head device in which two or three types of optical recording mediums having different thicknesses of transparent substrates are used, and is applicable even to an optical head device in which four or more types of optical recording mediums having different thicknesses of transparent substrates are used.

While the foregoing description and drawings represent the present invention, it will be obvious to those skilled in the art that various changes may be made therein without departing from the true spirit and scope of the present invention.

What is claimed is:

1. An objective lens for an optical head device which condenses two or more laser beams having wavelengths corresponding to two or more optical recording mediums having different thicknesses of transparent substrates on recording surfaces of the optical recording mediums via one optical condensing system to record information on the recording surfaces and/or reproduce the information on the recording surfaces, the objective lens comprising:
    a refractive surface including: a middle region which is formed in a middle portion of the refractive surface centering on an optical axis of the objective lens and which is used with respect to all of the optical recording mediums; one or more peripheral regions which are concentrically formed outside the middle region; and an aperture limiting ring band which is concentrically formed between the middle region and the peripheral region or between the peripheral regions;
    wherein the middle region includes: a plurality of middle ring-band refractive surfaces having aspherical shapes which are mutually different in refractive power; and stepped portions formed toward an optical axis direction in boundaries of the plurality of middle ring-band refractive surfaces;
    radial direction positions of the stepped portions are used as positions to correct spherical aberrations with respect to all of the optical recording mediums, and heights of the stepped portions and the aspherical shapes of the middle ring-band refractive surfaces excluding the middle ring-band refractive surfaces disposed adjacent to the aperture limiting ring band are formed in such a manner as to correct the spherical aberrations with respect to all of the optical recording mediums;
    the aperture limiting ring band is formed in the vicinity of a numerical aperture required in recording/reproducing the information with respect to one of the optical recording mediums in order to prevent the laser beam corresponding to the optical recording medium from being condensed on the recording surface of the optical recording medium;
    the peripheral region comprises one or more peripheral ring-band refractive surfaces; and
    the middle ring-band refractive surface and the peripheral ring-band refractive surface disposed adjacent to the aperture limiting ring band, or the peripheral ring-band refractive surfaces disposed adjacent to an inner peripheral side and an outer peripheral side of the aperture limiting ring band are formed into aspherical shapes optimized with respect to the specific optical recording medium.

2. The objective lens according to claim 1, wherein the optical recording mediums include a first optical recording medium on which a first laser beam having a first wavelength is condensed, and a second optical recording medium on which a second laser beam having a second wavelength shorter than the first wavelength is condensed,
    the middle region is used with respect to the first and second optical recording mediums, and the peripheral region is used only with respect to the second optical recording medium;
    the aperture limiting ring band is formed in the vicinity of the numerical aperture required in the recording/reproducing with respect to the first optical recording medium in order to prevent the first laser beam from being condensed on the recording surface of the first optical recording medium and to condense the second laser beam on the recording surface of the second optical recording medium; and
    the middle ring-band refractive surface and the peripheral ring-band refractive surface disposed adjacent to the aperture limiting ring band are formed into aspherical shapes optimized with respect to the second optical recording medium.

3. The objective lens according to claim 2, wherein an inner periphery of the aperture limiting ring band substantially agrees with the numerical aperture required in the recording/reproducing with respect to the first optical recording medium.

4. The objective lens according to claim 2, wherein the aperture limiting ring band includes a phase shifter which is added and formed into the aspherical shape optimized with respect to the second optical recording medium and which generates a phase difference in the first laser beam.

5. The objective lens according to claim 2, wherein the aperture limiting ring band includes diffraction grating which is added and formed into the aspherical shape optimized with respect to the second optical recording medium and in which a grating stepped portion is formed toward the optical axis direction.

6. The objective lens according to claim 5, wherein assuming that the first wavelength is $\lambda 1$, the second wavelength is $\lambda 2$, refractive indexes of the first and second laser beams in the objective lens are n1, n2, and arbitrary integers are a, b, a height d of the grating stepped portion satisfies a relation of:

$$d=a\times\lambda 2/(n2-1) \text{ and } d=(b+0.5)\times\lambda 1\times(n1-1).$$

7. The objective lens according to claim 6, wherein the height d of the grating stepped portion corresponds to approximately three times $\lambda 2/(n2-1)$, and approximately 2.5 times $\lambda 1/(n1-1)$ in a case where the first optical recording medium is a CD, and the second optical recording medium is a DVD.

8. The objective lens according to claim 5, wherein a grating groove pitch of the diffraction grating is five times or more a larger value of the first wavelength and the grating stepped portion, and 50 times or less a smaller value of the second wavelength and the grating stepped portion.

9. The objective lens according to claim 1, wherein the optical recording mediums include a first optical recording medium on which a first laser beam having a first wavelength is condensed, a second optical recording medium on which a second laser beam having a second wavelength shorter than the first wavelength is condensed, and a third optical recording medium on which a third laser beam having a third wavelength shorter than the second wavelength is condensed;

the middle region is used with respect to the first, second, and third optical recording mediums;

the peripheral region includes a first peripheral region which is used with respect to the second and third optical recording mediums, and a second peripheral region which is formed outside the first peripheral region and which is used only with respect to the third optical recording medium;

the aperture limiting ring band includes a first aperture limiting ring band formed between the middle region and the first peripheral region, and a second aperture limiting ring band formed between the first and second peripheral regions;

the first aperture limiting ring band is formed in the vicinity of the numerical aperture required in the recording/reproducing with respect to the first optical recording medium in order to prevent the first laser beam from being condensed on the recording surface of the first optical recording medium, to condense the second laser beam on the recording surface of the second optical recording medium, and to condense the third laser beam on the recording surface of the third optical recording medium;

the second aperture limiting ring band is formed in the vicinity of the numerical aperture required in the recording/reproducing with respect to the second optical recording medium in order to prevent at least the second laser beam from being condensed on the recording surface of the second optical recording medium and to condense the third laser beam on the recording surface of the third optical recording medium; and the peripheral ring-band refractive surfaces disposed adjacent to the inner peripheral side and the outer peripheral side of the second aperture limiting ring band are formed into aspherical shapes optimized with respect to the third optical recording medium.

10. An objective lens for an optical head device which condenses two or more laser beams having wavelengths corresponding to two or more optical recording mediums having different thicknesses of transparent substrates on recording surfaces of the optical recording mediums via one optical condensing system to record information on the recording surfaces and/or reproduce the information on the recording surfaces, the objective lens comprising:

a refractive surface including: a middle region which is formed in a middle portion of the refractive surface centering on an optical axis of the objective lens and which is used with respect to all of the optical recording mediums; one or more peripheral regions which are concentrically formed outside the middle region; and an aperture limiting ring band which is concentrically formed between the middle region and the peripheral region or between the peripheral regions;

wherein the middle region includes: a plurality of middle ring-band refractive surfaces having aspherical shapes which are mutually different in refractive power; and stepped portions formed toward an optical axis direction in boundaries of the plurality of middle ring-band refractive surfaces;

radial direction positions of the stepped portions are used as positions to correct spherical aberrations with respect to all of the optical recording mediums, and heights of the stepped portions and the aspherical shapes of the middle ring-band refractive surfaces are formed in such a manner as to correct the spherical aberrations with respect to all of the optical recording mediums;

the aperture limiting ring band is formed in a numerical aperture required in recording/reproducing the information with respect to one of the optical recording medium in order to prevent the laser beam corresponding to the optical recording medium from being condensed on the recording surface of the optical recording medium;

the peripheral region comprises one or more peripheral ring-band refractive surfaces; and the peripheral ring-band refractive surface disposed adjacent to an outer peripheral side of the aperture limiting ring band is formed into aspherical shape optimized with respect to the specific optical recording medium.

11. An optical head device comprising: an optical condensing system having the objective lens according to claim 1, and a laser light source which emits the laser beam, the optical head device recording information on the recording surface and/or reproducing the information on the recording surface.

* * * * *